Jan. 25, 1955  J. E. TRIPLETT  2,700,480
BOAT LAUNCHING TRAILER
Filed Nov. 8, 1952  3 Sheets-Sheet 3
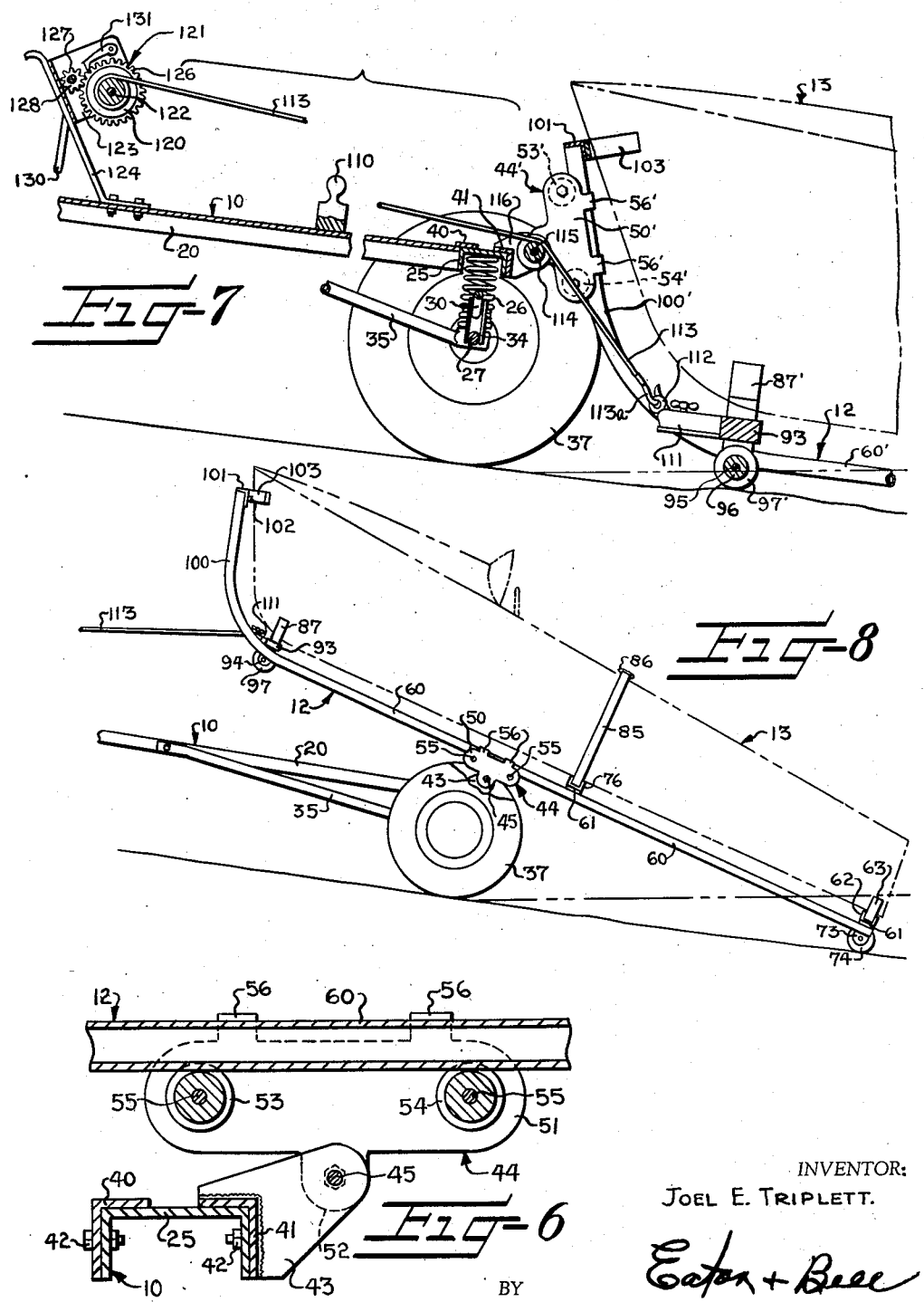
INVENTOR:
JOEL E. TRIPLETT.
BY Eaton + Bell
ATTORNEYS

United States Patent Office 2,700,480
Patented Jan. 25, 1955

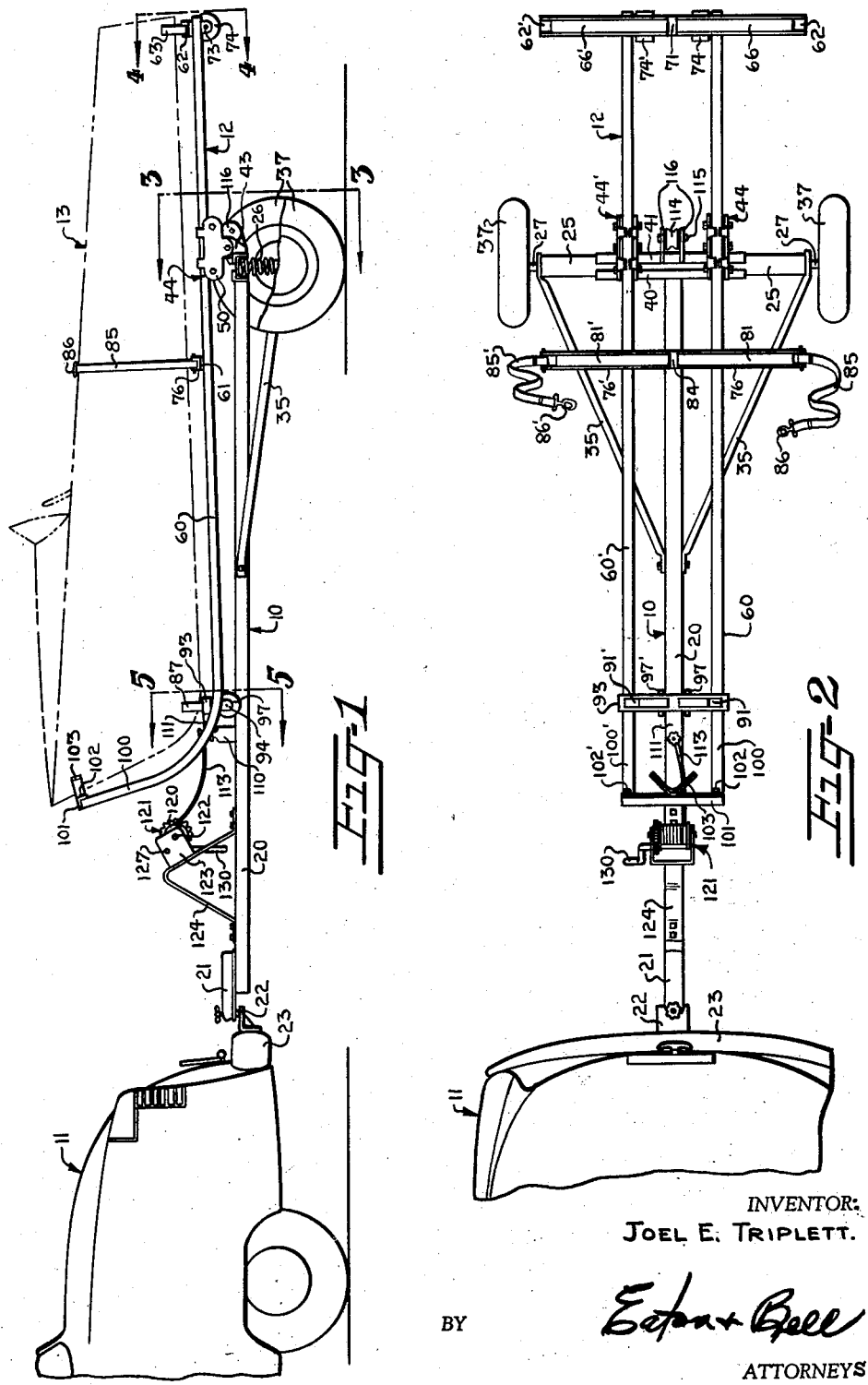

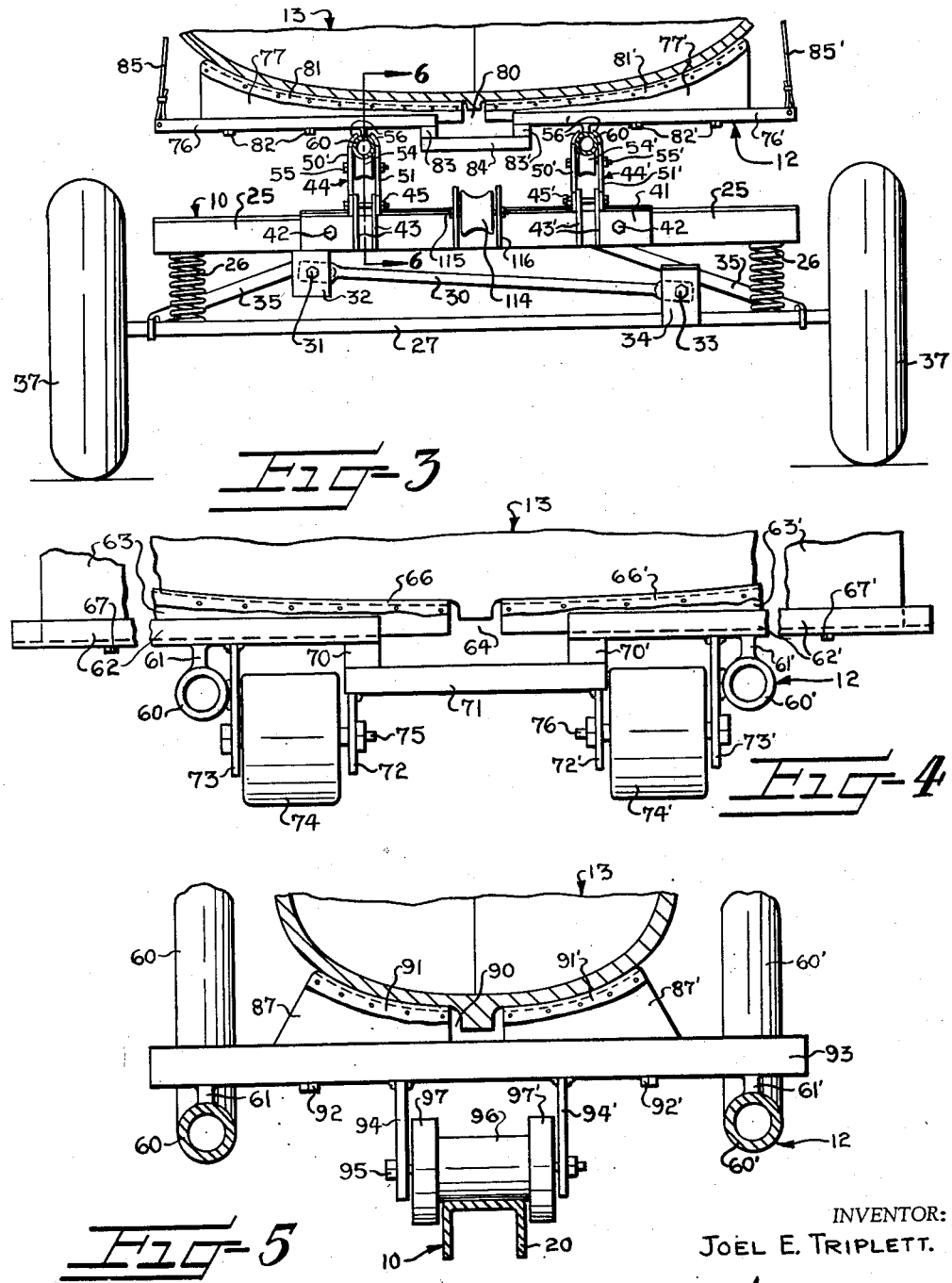

2,700,480

BOAT LAUNCHING TRAILER

Joel E. Triplett, Monroe, N. C.

Application November 8, 1952, Serial No. 319,580

5 Claims. (Cl. 214—84)

This invention relates to an improved boat launching, mooring and retrieving apparatus in combination with a wheeled trailer which may be attached to a transporting vehicle for carrying a boat over land from one place to another.

As is well known, the hull of most boats is formed of compound curves from stem to stern and, accordingly, it is practically impossible to arrange rollers on the cradle of a boat trailer so they fit the variantly-shaped hulls of different boats and so the boat can be moved back and forth upon said rollers, particularly when the stem of the boat is sharp or wedge-shaped and its stern is substantially flat. Also, in boat trailers heretofore in use it has been necessary to move the trailer into water deep enough to float the boat off of the same or onto the same in order to unload or load the same.

It is therefore an object of this invention to provide a trailer with a relatively movable boat docking platform, cradle or frame which is detachably connected to the trailer in such a manner that the platform may be positioned rearwardly of the trailer for launching or mooring the boat and quickly reloaded on the trailer with or without the boat thereon for transporting the platform or cradle from one place to another and whereby the platform with the boat thereon may be readily detached from the trailer for storing the boat while mounted upon the platform and while the trailer is being used to transport another similar platform with or without a boat thereon.

More specifically, it is an object of this invention to provide a combination trailer-mooring cradle of the character described wherein the mooring cradle comprises a pair of elongated parallel side frame members or side rails which are spanned by a plurality of longitudinally spaced transverse bolsters whose upper surfaces are shaped to conform substantially to the hull and keel of a boat, means for securing the boat on the cradle, and the front ends of said side rails curving upwardly and being spanned at their upper ends by a removable bar to which a V-shaped bow alining member is also secured and in which the bow of the boat may be positioned.

The trailer has a winch or other suitable means mounted adjacent the front end thereof from which a cable extends and is connected to a front portion of the cradle and said trailer is also provided with a pair of pivoted brackets at the rear end thereof, each provided with rollers therein and there being, one of these brackets alined with each of the side rails of the cradle. Means on the brackets substantially circumscribe the frame members of the docking platform or cradle to thereby maintain the cradle in engagement with said rollers carried by the brackets so that, as the cradle is moved off of the rear end of the trailer, the pivoted brackets permit the curved front ends of the side frame members of the docking cradle to move downwardly whereupon the boat may be detached from the cradle or fixed thereon, as the case may be, and the cradle may then be reloaded on the trailer by operation of the winch or other means by pulling the cradle forwardly onto the trailer.

If so desired, the transverse bar connecting the upper ends of the curved front portions of the side frame members of the cradle may be removed and the trailer moved upwardly relative to the cradle to move the pivoted brackets out of engagement with said side frame members to detach the cradle from the trailer whereby a platform with a boat thereon may be stored while another cradle is being used in association with said trailer.

It is evident that the cradle mounted on the trailer in the manner described will tilt downwardly at its rear end as the rear portion thereof is moved beyond its center of gravity relative to the pivoted brackets and, accordingly, it is contemplated that a trailer equipped with a frame connected thereto in this manner may readily be used for other purposes, such as a dump truck, by fixing a suitable bed upon said platform with a removable or hinged gate at the rear end of said bed.

Some of the objects of the invention having been stated, other objects will appear as the description proceeds, when taken in connection with the accompanying drawings, in which—

Figure 1 is a side elevation of the improved trailer showing the cradle in transporting position with a boat thereon shown in phantom lines and showing said trailer attached to a transporting vehicle;

Figure 2 is a top plan view of the structure shown in Figure 1, omitting the boat;

Figure 3 is an enlarged transverse vertical sectional view taken substantially along the line 3—3 in Figure 1 showing the rear end of the trailer in elevation;

Figure 4 is an enlarged fragmentary rear end elevation of the mooring platform, with portions broken away, looking along the line 4—4 in Figure 1 and showing a portion of the boat in cross-section resting upon the platform;

Figure 5 is an enlarged vertical sectional view taken substantially along the line 5—5 in Figure 1 and showing, in cross-section, a portion of the boat resting on the platform;

Figure 6 is an enlarged fragmentary vertical sectional view, taken substantially along the line 6—6 in Figure 3, showing the unique manner in which the platform is supported for movement on the trailer;

Figure 7 is an enlarged longitudinal vertical sectional view, with parts broken away, taken substantially along the line 7—7 in Figure 2, but showing the boat platform in launching position rearwardly of the trailer and showing the bow of the boat positioned upon the boat platform in phantom lines;

Figure 8 is an elevation of the rear portion of the trailer shown in Figure 1 showing the platform in partially unloaded or tilted position.

Referring more specifically to the drawings, the numeral 10 broadly designates a wheeled trailer adapted to be towed from one place to another by a suitable transporting means embodied in an automotive vehicle 11 and which trailer supports a relatively longitudinally movable frame, boat platform or cradle broadly designated at 12. The boat platform 12 is adapted to support a boat generally designated at 13, the bow of which is usually sharp or wedge-shaped and the rear portion or stern of the hull of which is substantially flat.

The trailer 10 comprises an elongated inverted channel-shaped frame member, beam or tongue 20 having a suitable trailer hitch 21 suitably secured to the front end thereof and adapted to be connected to a mating member 22 fixed to the rear bumper 23 of the automotive vehicle 11. The rear end of the tongue 20 of the trailer 10 is suitably secured to the front edge of a transverse channel-shaped frame member 25, opposite ends of which rest upon compression springs 26, whose lower ends rest upon an axle 27. A stabilizer rod 30 is pivotally connected to one end, as at 31, between a pair of plates 32 depending from the lower portion of the transverse bar or frame member 25.

The other end of the stabilizer rod 30 is pivotally mounted, as at 33, between a pair of plates 34, whose lower ends are suitably secured, as by welding, to opposite sides of the axle 27. The tongue 20 is also held in proper alinement with the transverse bar 25 by a pair of forwardly converging braces 35, the rear ends of which are fixed on the axle 27 adjacent opposite ends thereof and the front ends of which are suitably secured to opposite sides of the tongue 20. Suitable ground wheels 37 are rotatably mounted on opposite ends of the axle 27.

The transverse channel bar 25 has a pair of angle bars 40 and 41 suitably secured to the respective front and rear surfaces thereof and the upper surface thereof, which serve primarily as reinforcing members. The angle bars 40 and 41 are substantially shorter than the channel bar 25, are centrally located thereon and suitably removably secured thereto, as by bolts 42. The angle bar 41 has a pair of ears 43 and a similar pair of ears 43' suitably secured to the upper and rear surfaces thereof, which extend upwardly and rearwardly at an angle in Figures 1, 6 and 7 and to which respective pivoted cradle guide brackets or cuff members broadly designated at 44 and 44' are pivotally connected, as at 45 and 45'. Both of the brackets 44 and 44' are identical and only the bracket 44 will be described in detail and like reference characters shall apply to the bracket 44' with the prime notation added.

The bracket 44 may be of cast construction, but is shown as being of built-up construction and comprises a pair of elongated side plates 50 and 51 each of which has an ear portion 52 projecting downwardly intermediate its ends and these ear portions 52 straddle the ears 43 and are pivotally connected thereto at 45. The front and rear portions of the side plates 50 and 51 have respective guide rollers 53 and 54 rotatably mounted therebetween, the peripheries of which are preferably concave as shown in Figure 3. These guide rollers 53 and 54 are rotatably mounted on suitable pins or bolts 55, which span the distance between, and are suitably secured to, the side plates 50 and 51.

The upper portion of each of the side plates 50 and 51 has one or more upwardly and inwardly curved cradle rail retaining tabs or ears 56 integral therewith, there being two of the ears 56 shown in Figures 1, 2, 6, 7 and 8 associated with each of the side plates 50 and 51 and spaced longitudinally thereof adjacent and between the rollers 53 and 54.

*Boat platform or cradle*

The rollers 53, 54 and 53', 54' are adapted to support respective tubular side frame members or rails 60 and 60' which are parts of the cradle or boat supporting platform 12. These side rails 60 and 60' are preferably circular in cross-section and the peripheral surfaces of the guide rollers 53, 54, 53' and 54' preferably conform to the curvature of the side rails 60 and 60' and the ears 56 and 56' also preferably conform to the curvature of the side rails 60 and 60' of the boat supporting platform or cradle 12. However, the side rails 60 and 60' may be of any desired cross-sectional configuration and may be solid, if so desired, without departing from the spirit of the invention.

It will be observed in Figures 3, 4, 5 and 8 that the longitudinally extending side rails 60 and 60' have respective spacing blocks 61 and 61' suitably secured to their upper surfaces, as by welding, there being three such spacing blocks on each of said side rails 60 and 60'. The spacing blocks 61 and 61' are of such height and width as to pass freely between the ears 56 and 56' on the respective pairs of plates 50, 51 and 50', 51'. The upper ends of the rearmost spacing blocks 61 and 61' have the medial portions of respective bolster supporting bars 62 and 62' suitably secured thereto, as by welding.

These bolster supporting bars 62 and 62' are preferably in the form of channel bars whose flanges face upwardly and support respective bolsters 63 and 63' whose distal ends are spaced inwardly from the corresponding ends of the bolster supporting members 62 and 62' and whose proximal ends terminate in spaced relation to each other to form a slot 64 therebetween for accommodating, with sufficient clearance, the keel of the boat 13. The upper edges of the bolsters 63 and 63' curve inwardly and downwardly to conform to the shape of the hull or bottom of the boat to be carried and these upper edges are covered with a suitable cushioning strip or pad 66 of rubber, cloth, leather, or the like, so as to prevent any damage to the exterior finish of the boat 13. The bolsters 63 and 63' are suitably secured to the bolster supports 62 and 62' by any suitable means such as screws 67 and 67'.

The proximal ends of the bolster supports 62 and 62' are spaced substantially further apart than the proximal ends of the bolsters 63 and 63' and have respective spacing blocks 70 and 70' suitably secured to the lower surfaces thereof, to the lower surfaces of which the opposite ends of a frame member 71 are suitably secured, as by welding. Opposite ends of the frame member 71 have ears 72 and 72' depending therefrom and spaced outwardly from the respective ears 72 and 72' are respective plates or ears 73 and 73' whose upper ends are suitably secured, as by welding, to the lower surfaces of the respective bolster supports 62 and 62' and whose medial portions are suitably secured to the proximal surfaces of the respective frame members or side rails 60 and 60'.

The plates 72 and 73 have a roller 74 mounted for rotation therebetween on a pin or bolt 75 and the ears or plates 72' and 73' have a similar roller or wheel 74' mounted for rotation therebetween on a pin or bolt 76 carried by the plates 72' and 73' and spanning the distance therebetween.

It will be noted that the wheels or rollers 74 and 74' are disposed below the level of the side rails 60 and 60' so that they support the rear end of the cradle or boat platform 12 when it is tilted as shown in Figure 8 and moved over the ground.

Spaced forwardly from the bolster supports 62 and 62' and the bolsters 63 and 63' and disposed substantially midway the length of the side rails 60 and 60', are similar bolster supports 76 and 76' and bolsters 77 and 77' which are constructed in substantially the same manner as the bolster supports 62 and 62' and the bolsters 63 and 63'. The proximal ends of the bolsters 77 and 77' are spaced from each other to form a recess or slot 80 therebetween accommodating the keel of the boat 13 and the upper surfaces of the bolsters 77 and 77' are curved at a slightly less radius than the curved upper surfaces of the bolsters 63 and 63' and also have suitable cushioning strips 81 and 81' suitably secured to the upper surfaces thereof.

The bolsters 77 and 77' are fixed to the respective bolster supports 76 and 76' by any suitable means such as screws 82 and 82'. Spacing blocks 83 and 83' fixed to the lower surfaces of the proximal portions of the bolster supports 82 and 82' have opposite ends of a transverse frame member 84 suitably secured thereto. Medial portions of the bolster supports 76 and 76' are also fixed to a pair of the spacing blocks 61 and 61' heretofore described.

The lower or corresponding ends of pliable straps or belts 85 and 85' are pivotally connected to the distal ends of the transverse bolster supports 76 and 76' and the other ends of the belts 85 and 85' are provided with respective mating members 86 and 86' which are adapted to be connected together for securing the straps around the boat 13 and to hold the boat against the bolsters 63, 63', 77, 77' and a pair of corresponding front bolsters 87 and 87' (Figures 1, 2, 5, 7 and 8).

The front bolsters 87 and 87' correspond to the respective bolsters 77 and 77' and are positioned adjacent the front ends of the side rails 60 and 60'. Since the hulls of most boats are relatively narrower at the bow thereof than at the stern thereof and also curve more acutely than the stern and middle portions thereof, the upper surfaces of the front bolsters 87 and 87' are preferably curved at less radius than the intermediate bolsters 77 and 77' and the rear bolsters 63 and 63'. It will also be noted in Figures 2 and 5 that these bolsters 87 and 87' are substantially shorter and are also of greater height at their distal ends than the bolsters 77, 77', 63 and 63'.

It will be observed in Figure 5 that the proximal ends of the bolsters 87 and 87' are also spaced from each other to form a notch or slot 90 therebetween for accommodating the keel of the boat and the upper surfaces thereof are also provided with suitable cushioning strips 91 and 91'. The bolsters 87 and 87' are suitably secured, as by screws 92 and 92', to a common transverse frame member or bolster support 93.

The bolster support 93 is slightly longer than the distance between the remote surfaces of the side rails 60 and 60' and is suitably secured to the front pair of blocks 61 and 61'. Suitably secured to the lower surface of the front bolster support 93 and extending downwardly therefrom is a pair of plates or brackets 94 and 94' which support opposite ends of a bolt 95 on which a roller 96 having flanges 97 and 97' is rotatably mounted. The roller 96 is adapted to rest upon the tongue 20 of the trailer 10, when the cradle 12 is mounted upon the trailer 10, and the flanges 97 and 97' of the roller 96 straddle the tongue 20 of the trailer 10 to thus maintain the cradle 12 in vertical alinement with the axis of the tongue 20 of the trailer 10.

It will be observed in Figures 1, 5, 7 and 8 that the front ends of the side rails 60 and 60' curve upwardly immediately forwardly of the bolster support 93 to form slightly inclined portions 100 and 100', respectively, whose upper ends terminate at a substantially higher level than the mean horizontal planes of the side rails 60 and 60'. The upper ends of the portions 100 and 100' of the respective side rails 60 and 60' have opposite ends of a detachable bar 101 removably secured thereto, as by screws 102 and 102'; this bar being shown in the form of an angle bar. Suitably secured to the central portion of the bar 101 and extending rearwardly therefrom is a substantially V-shaped bow centering strap iron member 103 in which the upper portion of the bow of the boat 13 is adapted to be positioned when the boat is moored, and during transportation of the boat and the cradle from one place to another.

In order to maintain the cradle or boat platform 12 in fixed relation to the trailer 10 while being moved from one place to another, the tongue 20 of the trailer 10 has a suitable ball or first connecting member 110 suitably secured to the upper surface of a medial portion thereof which is adapted to be engaged by a socket member or second connecting member 111 suitably secured to and extending forwardly from the front transverse bolster support 93. The first and second connecting elements or members 110 and 111 are preferably in the form of mating members of a trailer hitch such as the members 21 and 22 in Figures 1 and 2. However, since there are many different ways in which the connecting members 110 and 111 may be constructed for securing the cradle 12 to the trailer 10, a detailed description and illustration of the connecting members 110 and 111 is deemed unnecessary.

It will be observed in Figure 7 that the front end of the connecting member 111 terminates in substantially the same lateral plane as the curved portions of the side rails 60 and 60' and has a means in the form of a ring 112 suitably secured thereto, as by welding, for releasably connecting the rear end of a flexible cable 113 thereto by means of a hook 113a. In Figure 7, the cable is shown as extending upwardly and forwardly at a slightly steeper angle than the inclined front portions 100 and 100' of the side rails 60 and 60' and passes over a pulley or roller 114 rotatably mounted on a shaft or bolt 115 carried by, and spanning the distance between, a pair of brackets or plates 116.

The brackets or plates 116 extend downwardly and forwardly at an angle and are suitably secured to the transverse frame member 41, to which the plates or ears 43 and 43' are secured. Thus, the plates 43, 43' and 116 may be removed from the transverse frame member 25 of the trailer 10 with the angle bar 41 to facilitate ease in manufacture and to also facilitate assembling the brackets 44 and 44' upon the plates 43 and 43' before the unit thus formed is secured to the transverse frame member 25. It is to be understood, however, that the plates 43, 43' and 116 may be suitably secured directly to the transverse frame member 25 in lieu of the angle bar 41, if so desired.

It is to be noted that the distance from the remote edges of the plates 116 and pulley 114 to the angle bar 41 is such compared with the positions of the rollers 53, 54 and 53', 54', carried by the respective brackets 44 and 44', that the flanges 97 of the roller 96 will clear the outer ends of these brackets or plates 116 as said flanges 97 and 97' are moved thereby with the side rails 60 and 60' riding against the guide rollers 53, 54 and 53', 54', respectively. It will slso be observed in Figure 7 that the flanges 97 and 97' of the roller 96 serve as ground wheels when the front end of the boat platform or cradle 12 is lowered relative to the trailer 10.

The cable 113 normally extends over the pulley 114, when the cradle 12 occupies substantially the position shown in Figure 7, and then extends forwardly and the front end thereof is fixed to a reel 120 which is a part of a winch broadly designated at 121. The reel 120 is rotatably mounted on a shaft 122 fixed between brackets or plates 123 which extend forwardly and are fixed to a strap iron winch support 124. The winch support 124 is shown as being substantially inverted V-shaped and is suitably secured to the upper surface of the tongue 20 of the trailer 10.

The reel or pulley 120 has a relatively large gear 126 fixed thereon which meshes with a pinion 127 fixed on a shaft 128 rotatably mounted in one of the brackets 123 and having a suitable handle or crank 130 fixed on the outer end thereof. Suitable mechanical means may be provided for driving the winch if desired. A pivoted pawl 131 may be provided on one of the plates 123 for engaging gear 126 to restrain rearward movement of the cradle 12, when desired.

*Method of operation*

Assuming the cradle or boat platform 12 to be in the loaded position upon the trailer 10 as shown in Figure 1 and, also assuming that a boat 13 is secured upon the cushion strips on the bolsters 63, 63', 77, 77', 87, and 87' by the belts or straps 85 and 85', the boat 13 and cradle 12 are unloaded by detaching the element 111 from the element 110, whereupon the operator grasps any convenient portion of the frame or cradle 12 and moves the same rearwardly relative to the trailer 10. Since the major portion of the boat 13 and cradle 12 are disposed forwardly of the brackets 44 and 44' when the coupling elements 110 and 111 are interconnected, when elements 110 and 111 are disconnected and rearward force is applied to the boat and its cradle, the roller 96 then rides upon the tongue 20 as the platform or cradle 12 is moved rearwardly and until the rear portion of the cradle 12 overbalances the front portion thereof.

Thereupon, the brackets 44 and 44' pivot about their respective pivot shafts 45 and 45' and permit the rear end of the platform or cradle 12 to move downwardly until the wheels 74 and 74' engage the ground or beach as shown in Figure 8. It is evident that the cable 113 is unwound from the reel 120 of the winch 121 as the cradle 12 is moved rearwardly relative to the trailer 10. Now, with continued rearward movement of the cradle 12, with the boat 13 thereon, from the position shown in Figure 8 to the position shown in Figure 7, the rollers or wheels 74 and 74' ride upon the beach and into the water until the buoyancy of the boat causes the rear portion of the cradle 12 to float.

Of course, as the curved and inclined front portions 100 and 100' of the respective side rails 60 and 60' move into engagement with the rollers carried by the brackets 44 and 44', the weight of the cradle or boat platform 12 causes the brackets 44 and 44' to pivot to substantially the position shown in Figure 7 thereby permitting the front wheels or flanges 97 and 97' of the roller 96 to rest upon the ground. The members 86 and 86' may then be disconnected to release the boat 13 from the cradle 12 and to permit the boat to be launched. Of course, the buckles or connecting members 86 and 86' on the belts 85 and 85' may be released at any time prior to the boat entering the water, if desired. In the event of the ground beneath the front wheels 97 and 97' being substantially lower than the ground on which the trailer wheels 37 rest, downward movement of the inclined portions 100 and 100' of the cradle 12 is limited by the bar 101 engaging the brackets 44 and 44' to prevent said inclined portions from moving free of said brackets 44 and 44'.

On the other hand, if the operator desires to store the boat on the platform or cradle 12 for an extended period, either on dry land or at the edge of the water, the screws 102 and 102' may be loosened and the bar 101 removed from the upper ends of the inclined portions 100 and 100' of the cradle 12, and the cable 113 disconnected from the ring 112, whereupon the rear wheels 37 may be raised relative to the cradle 12, either by a suitable jack or by pulling the trailer 10 forwardly with the wheeled cradle 12 so the wheels 37 rest upon rocks or upon a surface of the ground disposed at a substantially higher elevation than the surface upon which the wheels 97 and 97' of the cradle 12 are resting. This will cause the brackets 44 and 44' to move upwardly clear of the upper ends of the inclined portions 100 and 100' of the cradle 12, thereby releasing the cradle 12 from the trailer 10. Another cradle identical to the cradle 12 may then be attached to the trailer 10 or the same cradle 12 may be attached to the trailer 10 by reversing the above procedure.

Now, assuming that the cradle 12 is submerged in the water and the front end thereof is connected to the brackets 44 and 44', as shown in Figure 7; in order to moor the boat 13, it is merely necessary to direct the boat onto the cradle 12, alining the bow thereof with the V-shaped bow centering member 103 and to again secure the boat 13 to the cradle 12 by means of the straps 85 and 85' and the connectors or buckles 86 and 86'. Since the cradle 12 is of relatively light construction, it is evident that the rear end of the cradle 12 may be raised upwardly while the stern of the boat is afloat to position the rear bolsters 63 and 63' and the front bolsters 77 and 77' against the bow of the boat 13 and to facilitate securing the straps 85 and 85' about the boat 13.

The cradle with the boat 13 thereon is then readily drawn upon the trailer by the winch 121 until it arrives at the position illustrated in Figure 1, the position of the ring 112 (Figure 7) being such that manipulation of the winch 121 will cause the front end of the cradle 12 to ride upwardly against the rollers carried by the brackets 44 and 44' and to then cause the cradle 12 to move forwardly to substantially the position shown in Figure 1. The mating connecting members 110 and 111 are then interconnected in the usual manner to again secure the boat and the cradle 12 to the trailer 10.

Although only three sets of bolsters 63, 63', 77, 77' and 87, 87' are shown carried by the longitudinal side rails 60 and 60' of the cradle 12, it is to be understood that there may be a greater or lesser number of sets of bolsters carried by the side rails 60 and 60' and they may also be spaced differently from that illustrated in the drawings. Accordingly, the cradle 12 may be utilized as a dump truck by providing a suitable bed or container having a removable or hinged tailgate and securing the bed or container to the upper surface of the cradle 12 so that, when the cradle 12 is moved rearwardly relative to the trailer 10 to occupy substantially the position shown in Figure 8, the contents of the bed may then be dumped from the bed upon the ground, since the bed will then be inclined to facilitate discharging the contents therefrom.

It is thus seen that I have provided a unique form of chassis or cradle for supporting a boat or the like, in combination with unique means for detachably connecting the cradle to the trailer whereby, as the cradle is moved rearwardly relative to the trailer, the rear end of the cradle may tilt downwardly and be moved along the ground and, upon the front end of the cradle reaching the rear end of the trailer, the front end may also move downwardly and finally rest upon the ground or beach while still remaining attached to the trailer. Before backing the trailer off of the cradle, it is only necessary in most instances to position the rear end of the trailer at the edge of the water or to where the water is about two inches deeper than that necessary to float the boat, and as the cradle 12 with the boat thereon is moved into the water, the cradle will stay upon the ground, assuming that the connecting members 86 and 86' have previously been disconnected, and, thus the boat will readily be launched without the necessity of the operator wading into the water and whereby the operations of launching, mooring and loading the boat may be readily accomplished by a single operator.

Although a manually-operated winch is illustrated at 121 in the drawings, it is to be understood that a power-operated winch may be utilized in lieu of the manually-operated winch, in accordance with the size and weight of the boat, since the arrangement of the rollers 53, 54 and 53', 54' in the respective brackets 44 and 44' is such that substantially all boats of a size which may be transported upon a two wheeled or four wheeled trailer may be raised and pulled forwardly from the position shown in Figure 7 to that shown in Figure 1 by means of the improved cradle 12, the cable 113 and a suitable manually-operated or power-operated winch as embodied in the winch 121.

In the drawings and specification there has been set forth a preferred embodiment of the invention and although specific terms are employed, they are used in a descriptive and generic sense only, and not for purposes of limitation, the scope of the invention being defined in the claims.

I claim:

1. In a trailer having a longitudinal frame member and a transverse frame member fixed to the rear end of the longitudinal frame member, the combination of a pair of spaced pivoted brackets pivotally carried by said transverse frame member, each of said brackets having a pair of forwardly and rearwardly spaced guide rollers therein, a cradle comprising a pair of elongated side rails, transversely extending article support means spaced longitudinally on said side rails, means to confine said side rails in said brackets and in engagement with said rollers carried by the brackets, and said side rails being curved upwardly and forwardly at their front ends to form inclined portions whose upper ends terminate substantially above the longitudinal planes of the side rails whereby said cradle may be moved longitudinally off of said trailer and the front and rear portions of said cradle may rest upon the ground while the upwardly and forwardly curved inclined portions of the side rails thereof remain in engagement with said pivoted brackets.

2. In a trailer-wheeled platform combination, the combination of means for connecting the wheeled platform to said trailer for relative movement therebetween comprising a pair of pivoted brackets carried by the rear portion of said trailer and normally extending above the mean level of said trailer, said brackets being spaced transversely relative to the longitudinal axis of said trailer, a pair of forwardly and rearwardly spaced rollers carried by each of said brackets, said wheeled platform including a pair of longitudinally extending side rails, each of said side rails being curved upwardly and forwardly at its front end and adapted to fit against said rollers carried by the pivoted brackets, and means for confining said side rails against said rollers to thereby maintain said side rails in engagement with said rollers as the wheeled platform is moved longitudinally and vertically relative to the trailer.

3. Apparatus for use in conjunction with a wheeled trailer having a winch thereon and a cable extending from the winch; said apparatus comprising a cradle including longitudinally extending side rails, said side rails being curved upwardly and forwardly to form inclined portions at their front ends, pivoted brackets carried by the trailer and disposed at the rear end of said trailer, rollers in said brackets for permitting relative movement between the brackets and said cradle, means for confining the side rails in said brackets, at least one transverse frame member connected to and bridging said side rails at the junctures of the inclined portions with the major portions of said side rails, means for connecting the end of the cable remote from the winch to a medial portion of said frame member, and means on the rear end of the trailer for guiding said cable during relative vertical movement between the front end of the cradle and the rear end of the trailer.

4. In a boat launching trailer having a longitudinal frame member and a transverse frame member fixed to the rear end of the longitudinal frame member, the combination of a pair of spaced pivoted brackets pivotally carried by said transverse frame member, each of said brackets having a pair of forwardly and rearwardly spaced guide rollers therein, a cradle comprising a pair of elongated side rails, transversely extending bolsters spaced longitudinally on said side rails and on which a boat may be positioned, means to confine said side rails in said brackets and in engagement with said rollers carried by the brackets, said side rails being curved upwardly and forwardly at their front ends to form inclined portions whose upper ends terminate substantially above the longitudinal planes of the side rails whereby said cradle may be moved longitudinally off of said trailer and the front and rear portions of said cradle may rest upon the ground while the upwardly and forwardly curved inclined portions of the side rails thereof remain in engagement with said pivoted brackets, and a bar fixed at opposite ends thereof to the upper ends of said inclined portions to limit downward movement of said inclined portions relative to the brackets.

5. In a boat launching trailer having a longitudinal frame member and a transverse frame member fixed to the rear end of the longitudinal frame member, the combination of a pair of spaced pivoted brackets pivotally carried by said transverse frame member, each of said brackets having a pair of forwardly and rearwardly spaced guide rollers therein, a cradle comprising a pair of elongated side rails, transversely extending bolsters spaced longitudinally on said side rails and on which a boat may be positioned, means to confine said side rails in said brackets and in engagement with said rollers carried by the brackets, said side rails being curved upwardly and forwardly at their front ends to form inclined portions whose upper ends terminate substantially above the longitudinal planes of the side rails whereby said cradle may be moved longitudinally off of said trailer and the front and rear portions of said cradle may rest upon the ground while the upwardly and forwardly curved inclined portions of the side rails thereof remain in engagement with said pivoted brackets, a bar fixed at opposite ends thereof to the upper ends of said inclined portions to limit downward movement of said inclined portions relative to the brackets, and a substantially V-shaped bow centering member fixed to and extending rearwardly from a medial portion of said bar.

References Cited in the file of this patent

UNITED STATES PATENTS

| | | |
|---|---|---|
| 1,713,271 | Eason | May 14, 1929 |
| 1,866,640 | Fontaine | July 12, 1932 |
| 2,021,952 | Wren | Nov. 26, 1935 |
| 2,089,717 | Stratton et al. | Aug. 10, 1937 |
| 2,389,338 | Zorc, Jr. | Nov. 20, 1945 |
| 2,485,793 | Vassar | Oct. 25, 1949 |
| 2,558,418 | Brueckman | June 26, 1951 |
| 2,571,213 | Cunningham et al. | Oct. 16, 1951 |
| 2,586,485 | Schroeder | Feb. 19, 1952 |

FOREIGN PATENTS

| | | |
|---|---|---|
| 496,549 | Great Britain | Nov. 28, 1938 |